United States Patent
Svihla

(10) Patent No.: US 9,765,697 B2
(45) Date of Patent: Sep. 19, 2017

(54) TURBINE HOUSING SUPPORT FOR A TURBOCHARGER

(71) Applicant: Electro-Motive Diesel, Inc., LaGrange, IL (US)

(72) Inventor: Gary R. Svihla, Burr Ridge, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 335 days.

(21) Appl. No.: 14/489,725

(22) Filed: Sep. 18, 2014

(65) Prior Publication Data

US 2016/0084166 A1   Mar. 24, 2016

(51) Int. Cl.
| | |
|---|---|
| *F01D 25/24* | (2006.01) |
| *F01D 25/28* | (2006.01) |
| *F02C 6/12* | (2006.01) |
| *F02C 7/20* | (2006.01) |

(52) U.S. Cl.
CPC ............. *F02C 7/20* (2013.01); *F01D 25/243* (2013.01); *F01D 25/28* (2013.01); *F02C 6/12* (2013.01); *F05D 2220/40* (2013.01); *F05D 2230/60* (2013.01); *F05D 2260/30* (2013.01)

(58) Field of Classification Search
CPC ........ F01D 25/24; F01D 25/243; F01D 25/28; F02C 6/12; F02C 7/20; F04D 29/60; F04D 29/601; F04D 29/605; F04D 29/62; F04D 29/624; F04D 29/628; F04D 29/64; F04D 29/644; F04D 29/648; F05D 2220/40

See application file for complete search history.

(56) References Cited

U.S. PATENT DOCUMENTS

| 1,369,668 | A | * | 2/1921 | Junggren | ............... F01D 25/28 415/213.1 |
|---|---|---|---|---|---|
| 3,194,220 | A | * | 7/1965 | Dowell | ................... F02B 53/00 123/240 |
| 3,719,045 | A | * | 3/1973 | Hoffman | ................ B63B 21/10 228/135 |
| 3,891,345 | A | * | 6/1975 | Doolin | ................. F04D 29/605 248/678 |
| 4,090,358 | A | | 5/1978 | Young | |
| 4,414,725 | A | | 11/1983 | Breitweiser et al. | |
| 5,271,218 | A | * | 12/1993 | Taylor | .................... F02C 7/222 60/739 |

(Continued)

FOREIGN PATENT DOCUMENTS

| CH | 368020 | A | * | 3/1963 | ........... F01D 25/243 |
|---|---|---|---|---|---|
| CN | 102926873 | A | | 2/2013 | |

(Continued)

*Primary Examiner* — Christopher Verdier
*Assistant Examiner* — Christopher R Legendre
(74) *Attorney, Agent, or Firm* — Finnegan, Henderson, Farabow, Garrett & Dunner, LLP

(57) ABSTRACT

A turbine housing support is disclosed. The turbine housing support may have a flange. The flange may be configured to connect at least a pair of turbocharger components. The turbine housing support may also have a first column extending outward from a first location on a side surface of the flange. The first column may be disposed on a first side of the flange. The turbine housing support may also have a second column extending outward from a second location on the side surface of the flange. The second column may be disposed on a second side of the flange opposite the first side.

19 Claims, 4 Drawing Sheets

(56) References Cited

U.S. PATENT DOCUMENTS

| | | |
|---|---|---|
| 6,371,238 B1 | 4/2002 | Svihla |
| 8,028,967 B2 | 10/2011 | Busekros et al. |
| 8,083,471 B2 | 12/2011 | Black et al. |
| 8,206,133 B2 | 6/2012 | Mudel |
| 8,616,517 B2 * | 12/2013 | Huth ............... F01D 17/162 248/188.1 |
| 2007/0101713 A1 * | 5/2007 | Battig ............... F01D 25/243 60/598 |
| 2012/0014782 A1 | 1/2012 | Petitjean et al. |
| 2016/0084166 A1 * | 3/2016 | Svihla ............... F02C 7/20 60/605.1 |

FOREIGN PATENT DOCUMENTS

| | | | | |
|---|---|---|---|---|
| DE | 333906 C | * | 3/1921 | ............. F01D 25/28 |
| DE | 2739701 A1 | * | 3/1978 | ............. F01D 25/28 |
| FR | 418887 A | * | 12/1910 | ............. F01D 25/28 |

* cited by examiner

TURBINE HOUSING SUPPORT FOR A TURBOCHARGER

TECHNICAL FIELD

The present disclosure relates generally to a turbine housing support and, more particularly, to a turbine housing support for a turbocharger.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into combustion chambers of the engine. The increased supply of air allows more fuel to be burnt in the combustion chambers resulting in increased power output from the engine.

A typical turbocharger includes a housing, a shaft, a turbine wheel attached to one end of the shaft, and a compressor impeller connected to the other end of the shaft. Exhaust from the engine expands over the turbine wheel and rotates the turbine wheel. The turbine wheel, in turn, rotates the compressor impeller via the shaft. The compressor impeller receives cool air from the ambient and forces compressed air into the combustion chambers of the engine.

The exhaust from the engine is significantly hotter than the ambient air. As a result, the turbine portion of the turbocharger can undergo a higher degree of thermal expansion compared to the compressor portion and/or other relatively cooler components of the turbocharger. The differential thermal expansion causes relative motion between the attached components of the turbocharger, making it difficult to keep the components securely fastened to each other during operation of the turbocharger. The differential expansion can also cause the turbine wheel to come into contact with the turbocharger housing, causing damage to the turbine wheel and the turbocharger housing.

One attempt to address some of the problems described above is disclosed in U.S. Pat. No. 6,371,238 of Svihla issued on Apr. 16, 2002 ("the '238 patent"). In particular, the '238 patent discloses that a turbine end of the exhaust duct and a turbine inlet scroll are supported by a support structure that includes a pair of laterally spaced support legs having feet which are fixed to a base. The '238 patent further discloses that the legs extend upward on opposite sides of the rotational axis of the turbocharger to connect with the exhaust duct, or a duct support, at points above the axis of the rotor and associated ducting. Further, the '238 patent discloses that preferably, the points at which the legs are connected with the exhaust duct support are at selected points above the axis where vertical expansion of the exhaust housing between the axis and the connection with the legs approximately equals linear expansion of the legs.

Although the support structure disclosed in the '238 patent appears to account for thermal expansion, the disclosed support structure may still be less than optimal. In particular, making support legs separate from the duct support may add complexity and cost to the manufacturing process. Further, the legs of the support structure disclosed in the '238 patent appear to align with the bolting pattern on the exhaust duct. Thus, manufacture of the support legs may require complicated casting patterns, which may require cores to account for the bolting pattern, making the casting process more expensive. In addition, because the legs of the support structure of the '238 patent directly attach to the duct support, the disclosed support structure may not allow for differential thermal expansion between the connected components.

The turbine housing support structure of the present disclosure solves one or more of the problems set forth above and/or other problems of the prior art.

SUMMARY

In one aspect, the present disclosure is directed to a turbine housing support. The turbine housing support may include a flange. The flange may be configured to connect at least a pair of turbocharger components. The turbine housing support may also include a first column extending outward from a first location on a side surface of the flange. The first column may be disposed on a first side of the flange. The turbine housing support may also include a second column extending outward from a second location on the side surface of the flange. The second column may be disposed on a second side of the flange opposite the first side.

In another aspect, the present disclosure is directed to a turbocharger assembly. The turbocharger assembly may include a turbine housing comprising a turbine volute. The turbocharger assembly may also include a turbine wheel disposed within the turbine volute and configured to be driven by exhaust received from an engine. Further, the turbocharger assembly may include a compressor housing comprising a compressor volute. In addition the turbocharger assembly may include a compressor impeller disposed within the compressor volute. The compressor impeller may be configured to be driven by the turbine wheel. The compressor impeller and the turbine wheel may be coaxially disposed on a shaft. The turbocharger assembly may also include a rotor support housing disposed coaxially with the shaft. Additionally, the turbocharger assembly may include an integral turbine housing support. The turbine housing support may include a flange configured to connect the turbine housing and the rotor support housing. The turbine housing support may also include a first column extending outward from a first location on a side surface of the flange. The first column may be disposed on a first side of the flange. Further, the turbine housing support may include a second column extending outward from a second location on the side surface of the flange. The second column may be disposed on a second side of the flange opposite the first side.

DETAILED DESCRIPTION

Figure 1:
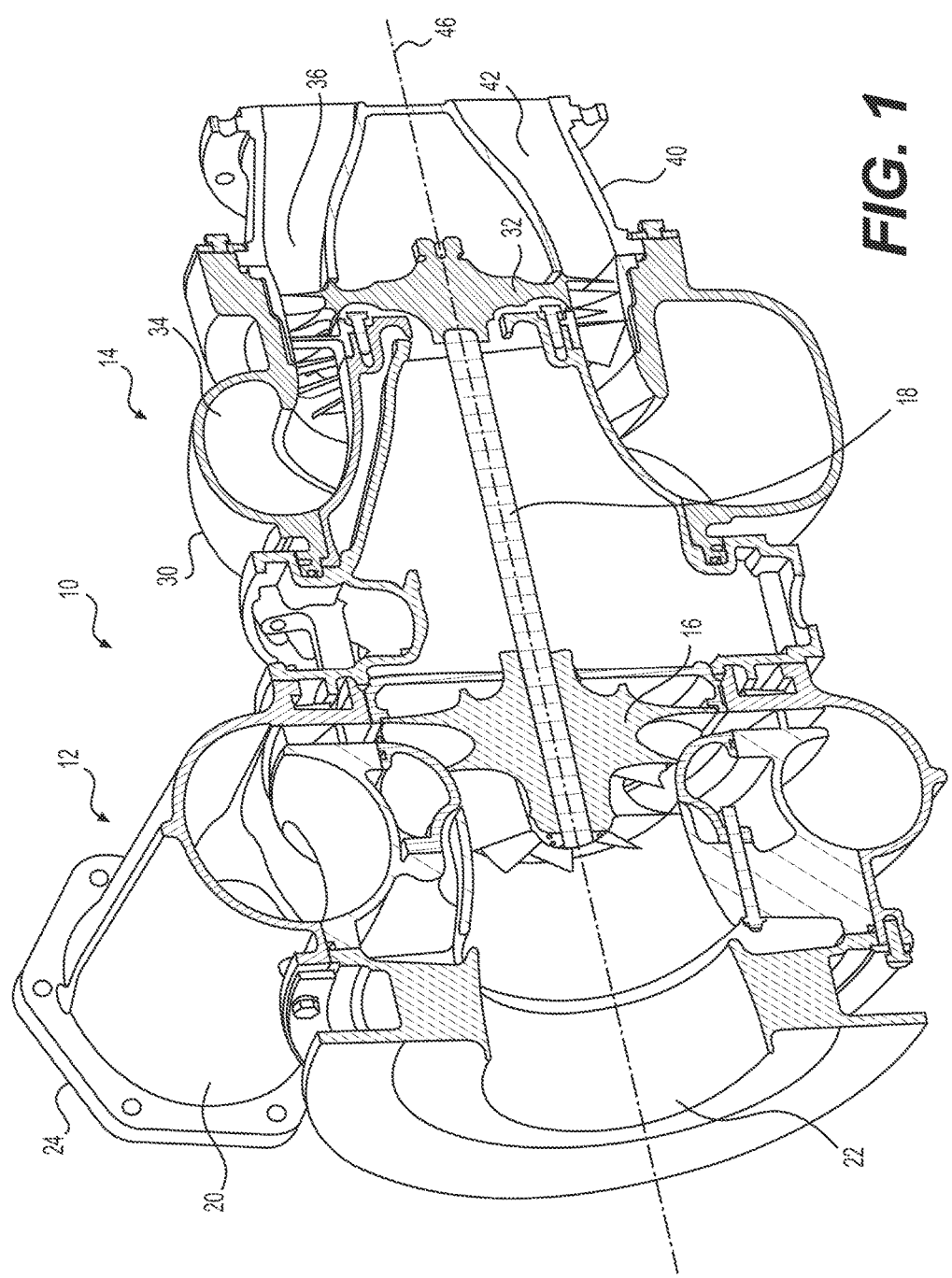
FIG. 1 is a cut-away view of an exemplary disclosed turbocharger.

FIG. 1 illustrates an exemplary embodiment of a turbocharger 10. Turbocharger 10 may be used with an engine (not shown) of a machine that performs some type of operation associated with an industry such as railroad, marine, power generation, mining, construction, farming, or another industry known in the art. As shown in FIG. 1, turbocharger 10 may include compressor stage 12 and turbine stage 14. Compressor stage 12 may embody a fixed geometry compressor impeller 16 attached to a shaft 18 and configured to compress air received from an ambient to a predetermined pressure level before the air enters the engine for combustion. Air may enter compressor housing 20 via compressor inlet 22 and exit compressor housing 20 via compressor outlet 24. As air moves through compressor stage 12, compressor impeller 16 may force compressed air into the engine.

Turbine stage 14 may include turbine housing 30 and turbine wheel 32, which may be attached to shaft 18. Exhaust gases exiting the engine may enter turbine housing 30 via turbine inlet 34 and exit turbine housing 30 via turbine outlet 36. As the hot exhaust gases move through turbine housing 30 and expand against the blades of turbine wheel 32, turbine wheel 32 may rotate compressor impeller 16 via shaft 18.

A rotor support housing 40 may be disposed adjacent turbine outlet 36. Rotor support housing 40 may cooperate with turbine housing 30 to support shaft 18. Rotor support housing 40 may include exhaust duct 42 through which exhaust gases may exit turbocharger 10. Rotor support housing 40 may be attached to the engine or to a structure associated with the engine. Differences in temperature and thermal inertia between turbine housing 30 and rotor support housing 40 may cause differential thermal expansion between the turbine housing 30 and rotor support housing 40. For example, turbine housing 30 may expand relative to rotor support housing 40 in a direction generally parallel to a rotational axis 46 of shaft 18. Turbine housing 30 may also expand relative to rotor support housing 40 in a radial direction generally orthogonal to rotational axis 46 when exposed to hot exhaust gases from the engine.

Figure 2:
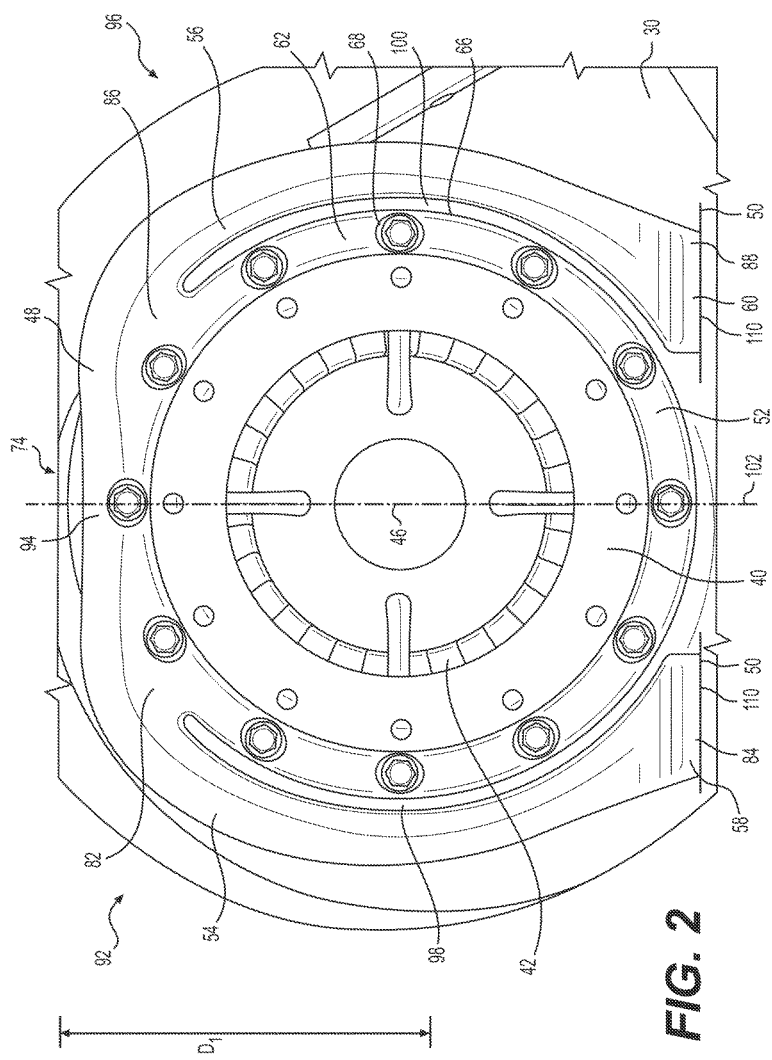
FIG. 2 is an illustration of an exemplary disclosed turbine housing support for the turbocharger of FIG. 1.

FIG. 2 illustrates an exemplary embodiment of a turbine housing support 48 for turbocharger 10. Support 48 may connect turbine housing 30 with rotor support housing 40. Support 48 may also connect turbocharger 10 to an attachment surface 50. In one exemplary embodiment, attachment surface 50 may be an outer surface of the engine. In another exemplary embodiment, attachment surface 50 may be a surface of a structure associated with the engine. the engine or to a structure associated with the engine. Support 48 may include flange 52, first column 54, second column 56, first foot 58, and second foot 60. In one exemplary embodiment, support 48, including flange 52, first and second columns 54, 56, and first and second feet 58, 60 may be an integral structure, for example, an integral casting. In another exemplary embodiment, support 48, including flange 52, first and second columns 54, 56, and first and second feet 58, 60 may be made of a ductile iron alloy.

As illustrated in FIG. 2, flange 52 may have a face 62, which may have an approximately circular shape. It is contemplated, however, that face 62 of flange 52 may have an elliptical or any other geometrical shape known in the art. Flange 52 may also include a flange extension 64 (see FIG. 3), which may have a side surface 66. Flange extension 64 may extend from face 62 in a direction generally parallel to rotational axis 46. For example, in FIG. 2, flange extension 64 may extend generally orthogonally into the page.

Flange 52 may also include a plurality of posts 68 disposed circumferentially on face 62. Post 68 may project outwardly from face 62 of flange 52 in a direction opposite to that of flange extension 64. For example, in FIG. 2, post 68 may project generally orthogonally out of the page. Post 68 may be a cylindrical projection extending from face 62 of flange 52. It is contemplated, however, that post 68 may have an elliptical, rectangular, polygonal or any other type of cross-section known in the art. Each post 68 may include a hole 70 (see FIG. 3). In one exemplary embodiment, posts 68 and holes 70 may be equally spaced from each other. Hole 70 may have a circular shape. It is contemplated, however, that hole 70 may have an elliptical, square, polygonal, slotted, or any other shape known in the art. Holes 70 may define a bolting pattern 74 on face 62 of flange 52. In the embodiment illustrated in FIG. 2, bolting pattern 74 may have an approximately circular shape. It is contemplated, however, that bolting pattern may have an elliptical or any other shape known in the art. Fasteners 72 (see FIG. 3) may pass through holes 70 to connect flange 52, turbine housing 30, and rotor support housing 40. Fasteners 72 may be nuts, bolts, screws, or any other types of fasteners known in the art.

First column 54 may extend outward from a first location 82 on side surface 66 of flange 52 to a first distal end 84. Second column 56 may extend outwards from second location 86 on side 62 of flange 52 to second distal end 88. First location 82 may be disposed on first side 92 of a flange end 94 on flange 52. Flange end 94 may represent a position on flange 52 disposed opposite attachment surface 50 where flange 52 attaches turbine housing 30 and rotor support housing 40 using fasteners 72. Second location 86 may be disposed on second side 96 of flange end 94 on flange 52. Second location 86 may be disposed opposite first location 82. In one exemplary embodiment, first and second locations 82, 86 may be co-located with flange end 94. In another exemplary embodiment, flange end 94 may be disposed at a distance "D1" from rotational axis 46, where distance D1 may be greater than an outer radius of exhaust duct 42.

First column 54 and second column 56 may extend circumferentially around flange 52 and may be disposed outside of bolting pattern 74. As used in this disclosure, outside of bolting pattern 74 means that first column 54 and second column 56 may be disposed at a radial distance from rotational axis 46 that is greater than a radial distance of any of the fasteners 72 from rotational axis 46. As illustrated in the exemplary embodiment of FIG. 2, first and second columns may conform to an approximately semi-circular shape of each half of flange 52 while remaining spaced apart from side surface 66 of flange 52. For example, as illustrated in FIG. 2, first column 54 may be disposed on first side 92 of flange 52 so as to be separated by a first gap 98 from side surface 66 of flange 52. Likewise, second column 56 may be disposed on a second side 96 of flange 52 so as to be separated by a second gap 100 from side surface 66 of flange 52. In one exemplary embodiment, first gap 98 may be uniform along a length of first column 54 from first location 82 to first distal end 84. Likewise, second gap 100 may be uniform along a length of second column 56 from second location 86 to second distal end 88. It is contemplated, however, that first gap 98 may be non-uniform along the length of first column 54 from first location 82 to first distal end 84. Likewise, it is contemplated that second gap 100 may be non-uniform along the length of second column 56 from second location 86 to second distal end 88. The shapes and lengths of first column 54 and second column 56 may be selected such that an amount of thermal expansion of first column 54 and second column 56 in a direction generally parallel to transverse axis 102 may be about equal to a radial thermal expansion of turbine housing 30.

First foot 58 may extend from first distal end 84 of first column 54. Second foot 60 may extend from second distal end 88 of second column 56. In one exemplary embodiment, first foot 58 may extend generally orthogonally (see FIG. 4)

from first column 54 in a direction generally parallel to rotational axis 46 and second foot 60 may extend generally orthogonally (see FIG. 4) from second column 56 in a direction generally parallel to rotational axis 46. It is contemplated, however, the first foot 58 and second foot 60 may extend from first and second distal ends 84, 88, respectively, at any angle. First foot 58 and second foot 60 may each have a mounting surface 110 configured to abut an attachment surface 50. First foot 58 and second foot 60 may be attached to attachment surface 50 using fasteners (not shown).

Figure 3:
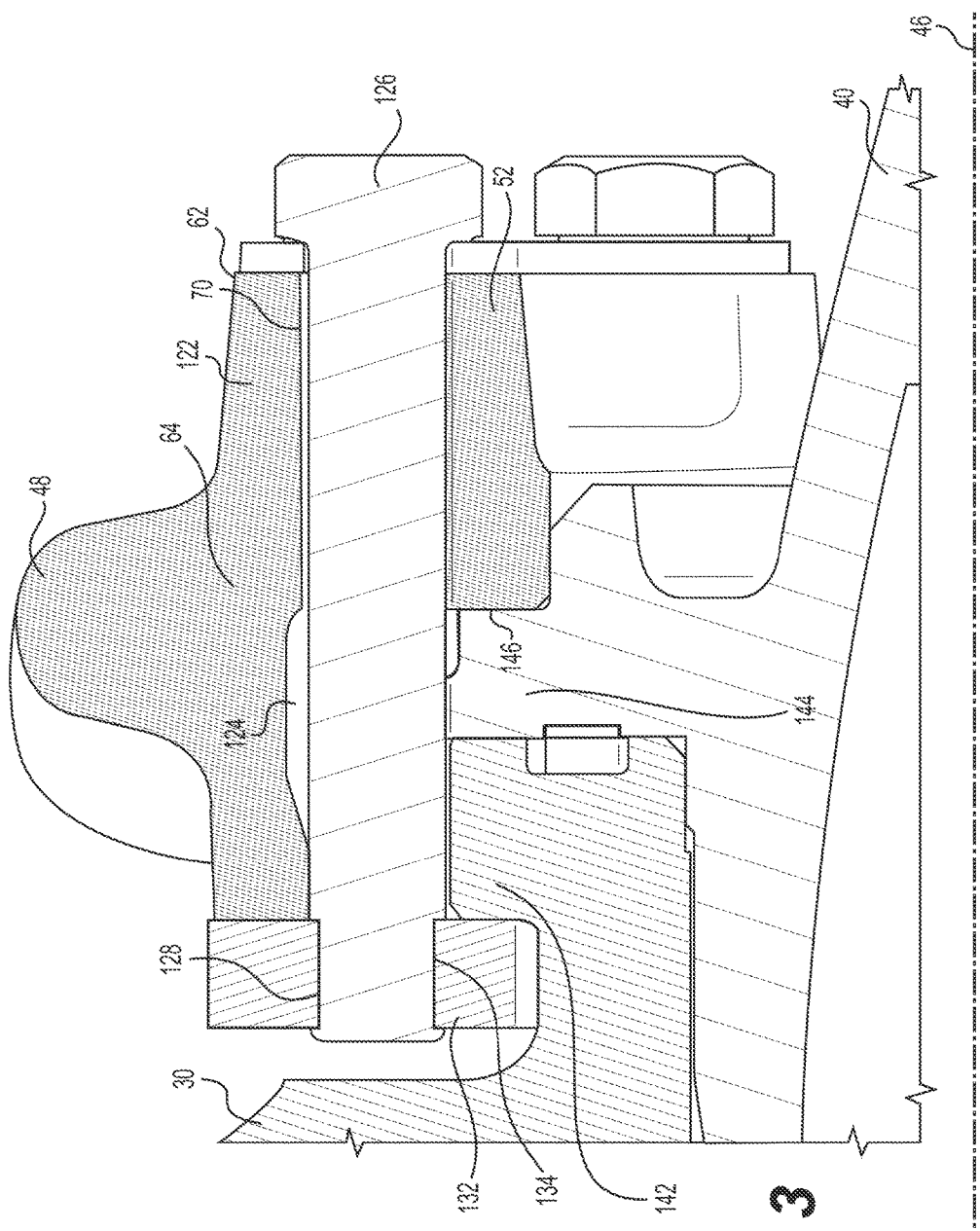
FIG. 3 is another cut-away view of the exemplary disclosed turbine housing support for the turbocharger of FIG. 1.

FIG. 3 illustrates a cut-away view of turbine housing support 48 for turbocharger 10. As shown in FIG. 3, flange 52 may be configured to attach a pair of turbocharger components. For example, as shown in FIG. 3, flange 52 may be configured to attach turbine housing 30 and rotor support housing 40. Flange 52 may include flange root 122, flange extension 64, and recess 124. Flange extension 64 may extend from flange root 122 in a direction generally parallel to rotational axis 46. Flange extension 64 may include side surface 66. Holes 70 may extend through flange root 122. Fastener 72 may pass through hole 70 and may be disposed in recess 124. Fastener 72 may have a fastener head 126 and a threaded portion 128, which may engage with plate 132. Plate 132 may include one or more tapped holes 134, which may engage with threaded portion 128 of fastener 72. Plate 132 may have a circular shape corresponding to face 62 of flange 52. It is contemplated, however, that plate 132 may be a multi-plate assembly including two or more arc shaped sections, which together may correspond to a shape of face 62 of flange 52.

Figure 4:
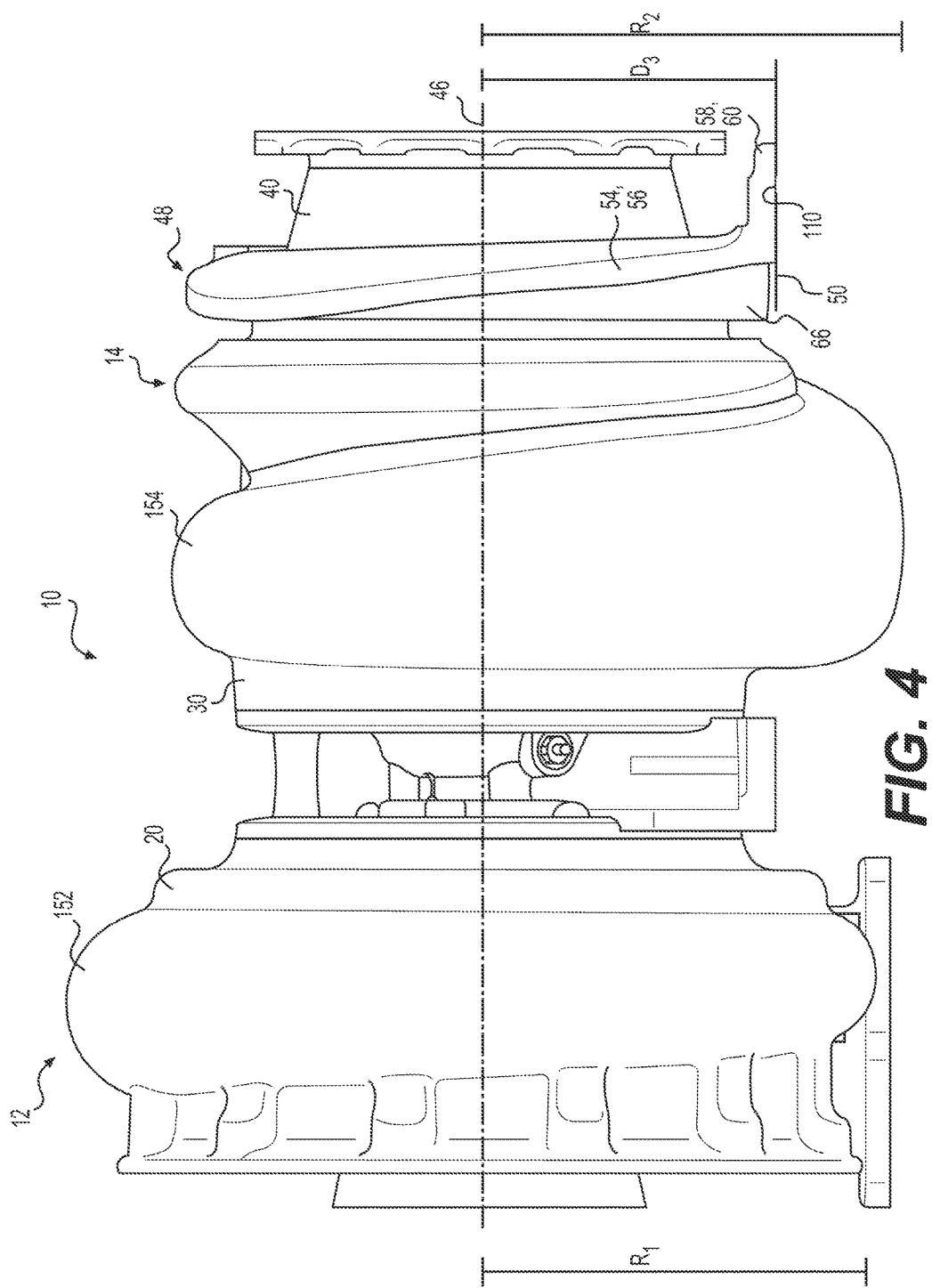
FIG. 4 is a side view of the exemplary disclosed turbocharger of FIG. 1.

As further illustrated in FIG. 4, turbine housing 30 may include a turbine housing flange 142. Rotor support housing 40 may likewise include a rotor support housing flange 144. Turbine housing flange 142 and rotor support housing flange 144 may be received in recess 124 of flange 52. Fasteners 72 may clamp turbine housing flange 142 and rotor support housing flange 144 between an inner surface 146 of flange root 122 and plate 132. One of ordinary skill in the art would recognize that connecting turbine housing 30 and rotor support housing 40 in this manner may allow turbine housing flange 142 and rotor support housing flange 144 to undergo different amounts of radial thermal expansion while at the same time remaining attached to each other by flange 52, fastener 72, and plate 132.

FIG. 4 illustrates a side view of turbocharger 10. As illustrated in FIG. 4, compressor housing 20, turbine housing 30, and rotor support housing 40 may be disposed coaxially about rotational axis 46. Compressor housing 20 may include compressor volute 152, which may have a radius "R1." Turbine housing 30 may include turbine volute 154, which may have a radius "R2." Mounting surface 110 may be disposed at a distance "D3" from rotational axis 46. In one exemplary embodiment, as illustrated in FIG. 3, distance D3 may be smaller than either or both of radii R1 and R2 of compressor volute 152 and turbine volute 154, respectively.

INDUSTRIAL APPLICABILITY

The disclosed turbine housing support may be implemented to support a turbocharger associated with an internal combustion engine. The disclosed support 48 may offer an improved turbocharger support structure because of the integrated structure of support 48 and because of the ability of support 48 to accommodate the relative thermal expansion of the hotter turbine components relative to the cooler rotor support housing.

Referring to FIGS. 1, 2, and 3, during engine operation as exhaust gases pass through turbine housing 30, turbine housing 30 may experience significant thermal expansion in both axial (along rotational axis 46) and radial (generally orthogonal to rotational axis 46) directions relative to the rotor support housing 40. First and second columns 54, 56 may attach to turbine housing 30 via flange 52 at a position above rotational axis 46 and adjacent to flange end 94 of turbine housing 30. Further, first and second columns 54, 56 may be attached to attachment surface 50 such that a distance D3 of mounting surface 110 from rotational axis 46 is smaller than either or both radii R1 and R2 of compressor volute 152 and turbine volute 154, respectively. By allowing mounting surface 110 to be closer to rotational axis 46, lengths of first and second columns 54, 56 may be selected to allow first and second columns 54, 56 to have sufficient flexibility to bend elastically through the entire operating range of turbocharger 10. Moreover, by attaching first and second columns 54, 56 adjacent to flange end 94 and by allowing mounting surface 110 to be closer to rotational axis 46, lengths of first and second columns 54, 56 may be selected so that an amount of thermal expansion of first and second columns along a transverse axis 102 may be about equal to an amount of radial expansion of turbine housing 30. As a result, compressor housing 20, turbine housing 30 and rotor support housing 40 may remain coaxial with each other during an entire operating range of turbocharger 10, helping to ensure that turbine wheel 32 does not come into contact with turbine housing 30.

Referring to FIG. 2, flange 52, first column 54, second column 56, first foot 92, and second foot 96 may comprise an integral casting. Making support 48 as an integral casting may reduce manufacturing costs by eliminating the need for machining Further, first column 54 and second column 56 may be disposed outside bolting pattern 74. Disposing first and second columns 54, 56 outside bolting pattern 74 may help ensure that the casting pattern for support 48 does not require any cores.

Referring to FIG. 3, flange 52 may include recess 124, which may receive turbine housing flange 142 and rotor support housing flange 144. Fasteners 72 may pass through holes 70 in flange root 122. Fasteners 72 may also be received in recess 124 and may engage with tapped holes 134 in one or more plates 132 to attach turbine housing 30 to rotor support housing 40. By ensuring that flange 52 is not fixedly attached to turbine housing 30 or to rotor support housing 40, support 48 may allow turbine housing flange 142 and rotor support housing flange 144 to undergo different amounts of radial thermal expansion, which may cause relative radial motion to occur between turbine housing flange 142 and rotor support housing flange 144. Although turbine housing flange 142 and rotor support housing flange 144 may move relative to each other radially, flange 52, fasteners 72 and plates 132 may help ensure that turbine housing 30 and rotor support housing 40 remain attached to each other over the entire operating range of turbocharger 10. Additionally, the use of tapped holes 134 in plates 132, may allow assembly of flange 52, fastener 72, and plate 132 with a single tool to turn fastener head 126 without the need for additional tools, for example, a second wrench to turn a bolt attached to fastener 72.

It will be apparent to those skilled in the art that various modifications and variations can be made to the disclosed turbine housing support structure. Other embodiments will be apparent to those skilled in the art from consideration of the specification and practice of the disclosed turbine housing support structure. It is intended that the specification and examples be considered as exemplary only, with a true scope being indicated by the following claims and their equivalents.

What is claimed is:

1. A turbine housing support, comprising:
a flange configured to connect at least a pair of turbocharger components;
a first column extending outward from a first location on a side surface of the flange, the first column being disposed on a first side of the flange; and
a second column extending outward from a second location on the side surface of the flange, the second column being disposed on a second side of the flange opposite the first side,
wherein the first column extends circumferentially around the flange on the first side from the first location, and the second column extends circumferentially around the flange on the second side from the second location, the first column and the second column being spaced apart from the side surface of the flange.

2. The turbine housing support of claim 1, wherein the flange, the first column, and the second column form a casting.

3. The turbine housing support of claim 2, wherein the casting is made out of a ductile iron-alloy material.

4. The turbine housing support of claim 1, wherein the flange has a recess to receive the at least a pair of turbocharger components.

5. The turbine housing support of claim 1, wherein
the flange includes a plurality of holes forming a bolting pattern, and
the first column and the second column are disposed outside the bolting pattern.

6. The turbine housing support of claim 5, wherein the holes are disposed circumferentially around the flange, the holes being disposed substantially equally spaced from each other.

7. The turbine housing support of claim 5, wherein the flange is configured to fixedly attach the at least a pair of turbocharger components using one or more fasteners passing through the holes in the bolting pattern.

8. The turbine housing support of claim 1, wherein:
the first column includes a first foot having a first mounting surface; and
the second column includes a second foot having a second mounting surface.

9. The turbine housing support of claim 8, wherein,
the first foot is configured to be attached to an attachment surface opposite the first location, and
the second foot is configured to be attached to the attachment surface opposite the second location.

10. The turbine housing support of claim 8, wherein a first distance between the first mounting surface and a rotational axis of the at least a pair of turbocharger components is smaller than a radius of the at least a pair of turbocharger components.

11. A turbocharger assembly, comprising:
a turbine housing including a turbine volute;
a turbine wheel disposed within the turbine volute and configured to be driven by exhaust received from an engine;
a compressor housing including a compressor volute;
a compressor impeller disposed within the compressor volute and configured to be driven by the turbine wheel, the compressor impeller and the turbine wheel being coaxially disposed on a shaft; and
a rotor support housing disposed coaxially with the shaft;
an integral turbine housing support, including:
a flange configured to attach the turbine housing and the rotor support housing;
a first column extending outward from a first location on a side surface of the flange, the first column being disposed on a first side of the flange; and
a second column extending outward from a second location on the side surface of the flange, the second column being disposed on a second side of the flange opposite the first side.

12. The turbocharger assembly of claim 11, wherein:
the turbine housing includes a radially extending turbine housing flange;
the rotor support housing includes a radially extending rotor support housing flange; and
the flange is configured to connect the turbine housing flange and the rotor support housing flange.

13. The turbocharger assembly of claim 12, wherein the flange includes:
a flange root including a plurality of holes forming a bolting pattern;
a flange extension extending from the flange root generally parallel to a rotational axis of the shaft; and
a recess to receive the turbine housing flange and the rotor support housing flange.

14. The turbocharger assembly of claim 13, further including:
a plate having a plurality of tapped holes corresponding to the holes in the bolting pattern, wherein the plate cooperates with the flange root to connect the turbine housing flange and the rotor support housing flange.

15. The turbocharger assembly of claim 13, wherein the first column and the second column are disposed outside the bolting pattern.

16. The turbocharger assembly of claim 13, wherein:
the first column extends circumferentially around the flange on the first side from the first location; and
the second column extends circumferentially around the flange on the second side from the second location.

17. The turbocharger assembly of claim 13, wherein:
the first column includes a first foot having a first mounting surface; and
the second column includes a second foot having a second mounting surface.

18. The turbocharger assembly of claim 17, wherein:
the turbine volute has a first radius;
the compressor volute has a second radius; and
a distance between the rotational axis of the shaft and the first mounting surface is less than at least one of the first radius and the second radius.

19. The turbocharger assembly of claim 13, wherein lengths of the first column and the second column are selected such that when a temperature of the turbocharger assembly increases, a first amount of thermal expansion of the first column and the second column is substantially equal to a second amount of radial thermal expansion of the turbine volute.

* * * * *